United States Patent
Hu et al.

(10) Patent No.: US 8,098,990 B2
(45) Date of Patent: Jan. 17, 2012

(54) SYSTEM AND METHOD FOR PROVIDING WIRELESS OVER A PASSIVE OPTICAL NETWORK (PON)

(75) Inventors: Junqiang Hu, Princeton, NJ (US); Ting Wang, Princeton, NJ (US); Dayou Qian, Plainsboro, NJ (US); Yuanqiu Luo, Hightstown, NJ (US); Yoshihiko Suemura, Tokyo (JP); Makoto Shibutani, Tokyo (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 687 days.

(21) Appl. No.: 11/832,075

(22) Filed: Aug. 1, 2007

(65) Prior Publication Data
US 2008/0063397 A1 Mar. 13, 2008

Related U.S. Application Data

(60) Provisional application No. 60/825,277, filed on Sep. 12, 2006, provisional application No. 60/882,024, filed on Dec. 27, 2006.

(51) Int. Cl.
*H04J 14/00* (2006.01)

(52) U.S. Cl. ........... 398/72; 398/66; 398/68; 398/69; 398/76; 398/79; 398/100; 398/99; 398/115; 455/561; 455/562; 455/422; 455/3.1; 455/5.1; 725/105; 725/106; 725/125; 725/127; 725/129; 370/352; 370/392; 370/389; 370/468; 370/432

(58) Field of Classification Search ............ 398/66, 398/67, 68, 69, 70, 71, 72, 74, 75, 78, 79, 398/77, 98, 99, 100, 115, 116, 117, 58, 59, 398/89, 43, 38, 76; 455/3.1, 5.1, 6.1, 6.3, 455/4.1, 4.2, 561, 422, 562, 436; 725/105, 725/106, 121, 125, 127, 129; 370/352, 392, 370/389, 468, 432, 465
See application file for complete search history.

(56) References Cited

U.S. PATENT DOCUMENTS

| | | | |
|---|---|---|---|
| 5,339,184 A | 8/1994 | Tang | |
| 5,627,879 A | 5/1997 | Russell et al. | |
| 5,644,622 A * | 7/1997 | Russell et al. | 455/422.1 |
| 5,657,374 A | 8/1997 | Russell et al. | |
| 5,867,763 A * | 2/1999 | Dean et al. | 725/114 |
| 5,987,303 A | 11/1999 | Dutta et al. | |
| 6,674,966 B1 * | 1/2004 | Koonen | 398/70 |
| 6,895,185 B1 * | 5/2005 | Chung et al. | 398/72 |
| 2003/0072055 A1 * | 4/2003 | Mickelsson et al. | 359/124 |
| 2006/0045525 A1 * | 3/2006 | Lee et al. | 398/71 |
| 2006/0182446 A1 * | 8/2006 | Kim et al. | 398/72 |
| 2007/0019956 A1 * | 1/2007 | Sorin et al. | 398/71 |

OTHER PUBLICATIONS

Eklund, et al., IEEE Standard 802.16: A Technical Overview of the WirelessMAN Air Interface for Broadband Wireless Access; IEEE Communications Magazaine; Jun. 2002; pp. 98-107.
Green; Fiber to the Home: The Next Big Broadband Thing; IEEE Communications Magazine; Sep. 2004; pp. 100-106.
Novak, et al., Fibre-Radio—Challenges and Possible Solutions; International Topical Meeting on Microwave Photonics; Sep. 10-12, 2003; pp. 49-54.
WAKE; Trends and Prospects for Radio Over Fibre Picocells; Proc. IEEE MWP2002; 2002; pp. 1-7.

* cited by examiner

*Primary Examiner* — Hanh Phan
(74) *Attorney, Agent, or Firm* — James Bitetto; Joseph Kolodka

(57) ABSTRACT

A network system and method include a wireless base station integrated at a central office of a service provider. The wireless base station is configured to provide portable and fixed services to customers. A passive optical network is coupled to the wireless base station at the central office to provide a link to extend an antenna for wireless operations of the wireless base station to a remote site such that a wireless signal from the wireless base station is transmitted in parallel with a passive fiber network signal through the link.

16 Claims, 7 Drawing Sheets

SYSTEM AND METHOD FOR PROVIDING WIRELESS OVER A PASSIVE OPTICAL NETWORK (PON)

RELATED APPLICATION INFORMATION

This application claims priority to provisional application Ser. No. 60/825,277 filed on Sep. 12, 2006 and provisional application Ser. No. 60/882,024 filed on Dec. 27, 2006, both incorporated herein by reference.

The present application is related to U.S. application Ser. No. 11/867,090, entitled "Wavelength Division Multiplexing Passive Optical Network Architecture to Provide Triple Play Services with Source-Free Optical Network Units", filed Oct. 4, 2007 and incorporated herein by reference.

BACKGROUND

1. Technical Field

The present invention relates to network systems and more particularly to a network where a wireless interface is extended through a dedicated optical fiber link.

2. Description of the Related Art

The emergence of broadband applications like internet protocol (IP) television (IPTV) stimulates the quick deployment of "fiber to the 'x'" (FTTx, fiber to a particular type of customer premises), especially with Passive Optical Networks (PON), due to its low cost and high capacity. With the growing amount of PON subscribers, annual sales of the PON equipment are projected to grow accordingly.

Broadband wireless access (BWA) technology has been drawing increased interest due to its high flexibility and possibility for quick service deployment, which enables broadband services to traditional wireline users and to users in rural areas, where cable and DSL are not available. After the standardization of IEEE 802.16d/e WiMAX (Worldwide Interoperability for Microwave Access), the speed of adopting BWA increased greatly. Therefore, the global WiMAX equipment market is predicted to grow substantially.

Within existing access network solutions, service providers have treated wireless and wireline networks separately. This includes setting up dedicated links to connect these separate networks.

For dedicated links, to connect base stations from a central office, the current solutions use a plurality of time division multiplexed (TDM) links like T1/E1 or T3/OC-3, asynchronous packet links like Ethernet, or microwave/wireless point-to-point links, and terminate the subscriber station traffic at the base station. In other solutions, a radio frequency over fiber (RoF) is employed to transmit information. Such solutions require dedicated fiber links for each base station; thus requiring costly implementation.

These solutions have the following drawbacks. They require dedicated wireline connections to the central office. Note although the microwave/wireless point-to-point links eliminate the dedicated wireline connection) additional microwave/wireless equipment is needed, which is expensive to purchase and maintain. In addition, the interfaces and/or equipment between the base stations and the central office increase management costs.

Another approach takes advantage of the existing network infrastructure. For example, to provide wireless services to residential areas, a pre-constructed PON network can be employed, in which the wireless traffic is terminated at the PON ONUs (Optical Network Unit). This approach is similar to those described above except that the wireline capacity is not dedicated to the base stations, and it is shared among different applications. This solution needs to allocate certain wireline bandwidth to carry wireless services; thus, it is often difficult to realize in heavy-traffic scenarios.

SUMMARY

Dedicated links or cascaded connections are not economic. An appropriate solution should maximize the utilization of the existing network infrastructure or those under construction, while simplifying network management. The flexibility, ease of deployment of wireless access technologies and the broadband nature of optical access technologies make them excellent complements to each other. This complementary relationship and the quick development of the two technologies provide cost-effective implementations of a heterogeneous network that integrates both optical and broadband wireless access networks. This heterogeneous network should also be able to efficiently utilize the network resources and reduce the management and maintenance costs. The wireless over PON network in accordance with the present principles accommodates these requirements. PON and wireless access networks will be widely deployed in the near future, the present embodiments take advantage of the PON infrastructure to extend the service areas, and quickly deliver broadband wireless services to portable/mobile customers as well as customers that cannot be economically reached by wireline connections. The present approach also integrates (pulls up) the wireless base stations (BS) into a central office to save PON bandwidth.

A solution to integrate the wireless base station (using WiMAX as an example technology) at the central office, and enable the delivery of both portable and fixed services to the customers with reduced costs is disclosed. The wireless base station takes advantage of a Gigabit PON (GPON) infrastructure to extend an antenna (RF module) to a remote site, so that the wireless signal is transmitted in parallel with the PON signal through the same PON fiber link. The wireless signal over fiber can be intermediate frequency (IF, analog) over fiber, or a digitized signal (e.g., a digitized IF signal) over fiber. The multiplexing schemes to transmit the signals in parallel may include sub-carrier modulation (SCM) multiplexing and/or wavelength-division multiplexing (WDM). In the receiver side, a filter may be employed to separate the signals.

In one embodiment, a wavelength-division multiplexed passive optical network (WDM-PON) may be employed, and the multiplexing schemes for this network may include WDM, SCM, and TDM (time division multiplexing). If the needed capacity can be handled using SCM multiplexing, wireless over PON can also take advantage of "parallel signal detection" (PSD), which uses a unique sub-carrier for each individual wavelength, and a single optical receiver is used at the base station (BS) indoor units (IDUs), or each location of the BS outdoor units (ODUs). The embodiments of the present invention advantageously permit the utilization of bandwidth over the established fiber links such as PON to transmit information thus substantially reducing cost.

A network system and method include a wireless base station integrated at a central office of a service provider. The wireless base station is configured to provide portable and fixed services to customers. A passive optical network is coupled to the wireless base station at the central office to provide a link to extend an antenna for wireless operations of the wireless base station to a remote site such that a wireless signal from the wireless base station is transmitted in parallel with a passive fiber network signal through the link.

A method for simultaneously providing wireline and wireless services includes integrating a wireless base station at a central office of a service provider, the wireless base station being configured to provide portable and fixed services to customers, coupling a passive optical network to the wireless base station at the central office to provide a link to extend an antenna for wireless operations of the wireless base station to a remote site, and transmitting a wireless signal from the wireless base station in parallel with a passive fiber network signal through the link.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with the present principles provide a wireless over passive optical network (PON) solution designed to maximize the utilization of the existing network infrastructure or those under construction while simplifying network management. In accordance with the present principles, Worldwide Interoperability for Microwave Access (WiMAX) will be employed as an illustrative telecommunications technology aimed at providing wireless data over distances. WiMAX as the wireless access technology and GPON (Gigabit PON) as the optical access technology are herein described for illustrative purposes and should not be construed as limiting the present invention as other technologies are also contemplated.

It should be understood that the elements shown in FIGS. may be implemented in various forms of hardware, software or combinations thereof. Preferably, these elements are implemented in a combination of hardware and software on one or more components. The components may include appropriately programmed general-purpose digital computers or the like having a processor and memory and input/output interfaces. Software includes but is not limited to firmware, resident software, microcode, etc.

Figure 1:
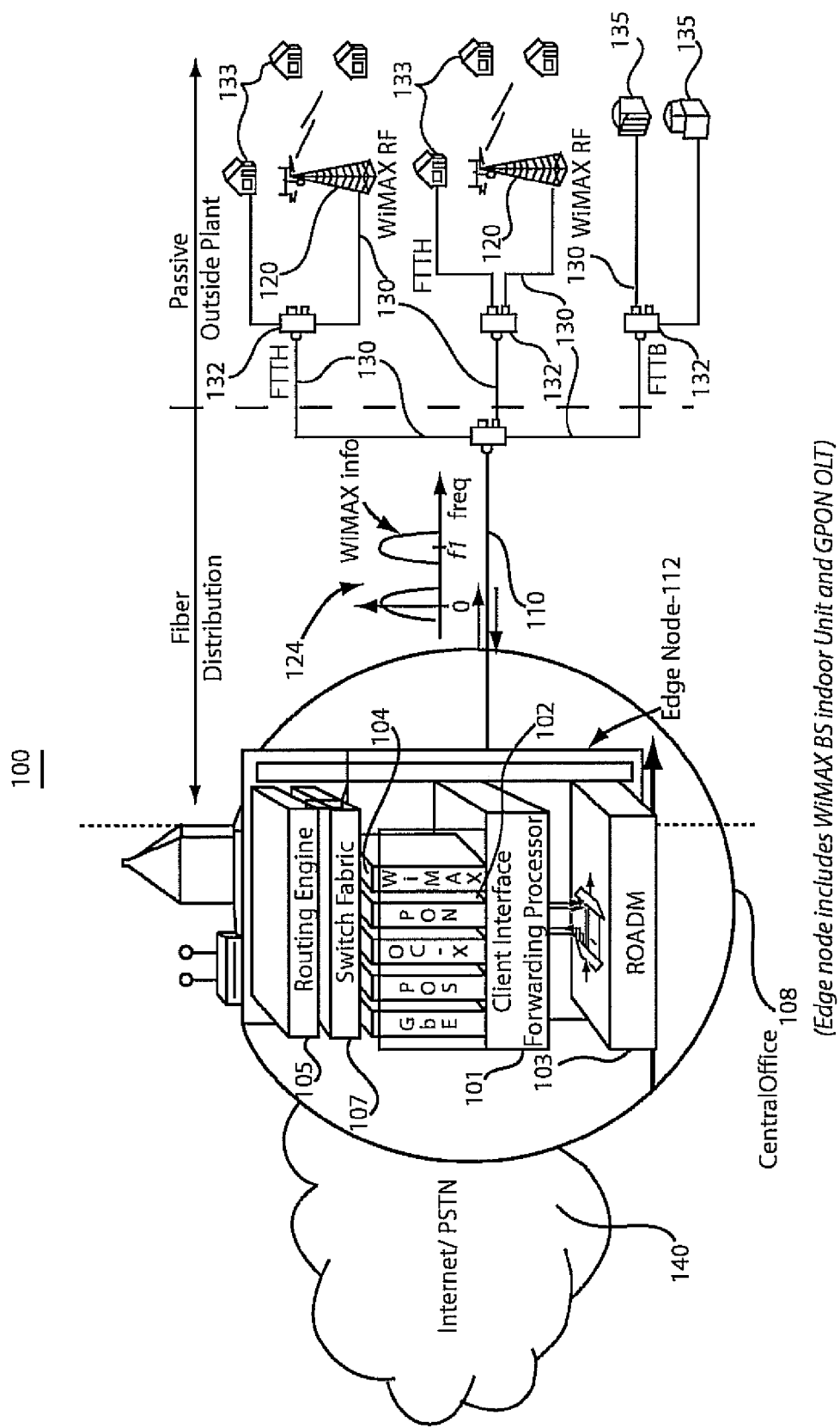
FIG. 1 is a diagram showing a WiMAX over GPON network architecture in accordance with one illustrative embodiment.

Referring now to the drawings in which like numerals represent the same or similar elements and initially to FIG. 1, a wireless over PON network architecture 100 is illustratively shown in accordance with one embodiment. Architecture 100 integrates both a GPON base station 102 and a WiMAX base station 104 in a central office 108. A WiMAX signal is transmitted in parallel with a GPON signal through a GPON fiber link 110. Central office 108 may include a client interface/forwarding processor 101 for executing and maintaining system functions and core interfaces, such as Gigabit Ethernet (GbE), point of service (POS), optical cross connect (OC-X), etc. A routing engine 105 and switch fabric 107 are also provided for appropriately routing signals to and from customers. A reconfigurable optical add/drop multiplexer (roadm) module 103 is provided to route signals. The central office 108 is preferably an edge node 112 at the edge of the Internet or public switched telephone network (PSTN) 140. The edge node 112 integrates the WiMAX base station 104, which is preferably an indoor unit, and other wireline access interfaces, e.g., PON OLT (Optical Line Terminal) as well as core interfaces.

The WiMAX indoor unit 104 includes WiMAX MAC (Media Access Control) and an intermediate frequency (IF) PHY (Physical layer). A remote wireless tower 120 becomes simple, since the radio frequency (RF) function is left within a remote node for that tower 120. The signal between the WiMAX indoor 104 (e.g., inside the central office 108) and outdoor (e.g., the remote tower 120) units (IDU & ODU) is transmitted through the GPON fiber link 110. To avoid interference and save the GPON capacity, sub-carrier modulation (SCM) is the preferred multiplexing scheme, e.g., the WiMAX signal 124 is modulated to a sub-carrier frequency, f1, which can be separated from the base band GPON signal.

This architecture 100 enables the carriers to support both wireline and wireless customers simultaneously, while pulling the wireless base stations up to the central office 108 without occupying the GPON bandwidth, which potentially reduces the equipment, installation, and operation costs. With the increasing demand of both wireline and wireless applications, this solution is extremely useful. GPON link 110 distributes signal through a network of fiber 130 and splitters 132 which provide service to a plurality of homes 133 (FTTH) and businesses 135 (FTTB).

Figure 2A:
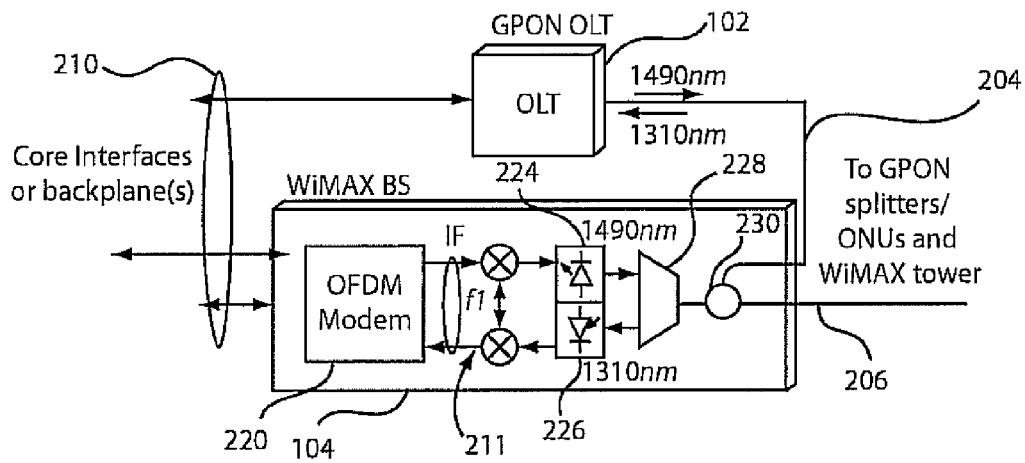
FIG. 2A is a schematic diagram showing a WiMAX base station indoor unit and GPON optical line terminal (OLT) combination where the units are connected but separate.
Figure 2B:
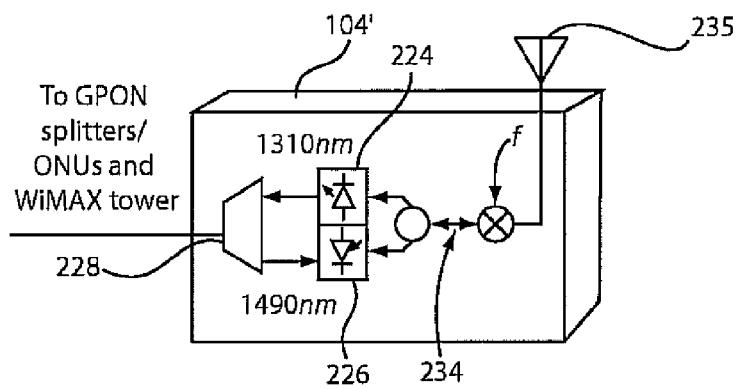
FIG. 2B is a schematic diagram showing a WiMAX base station outdoor unit.
Figure 2C:
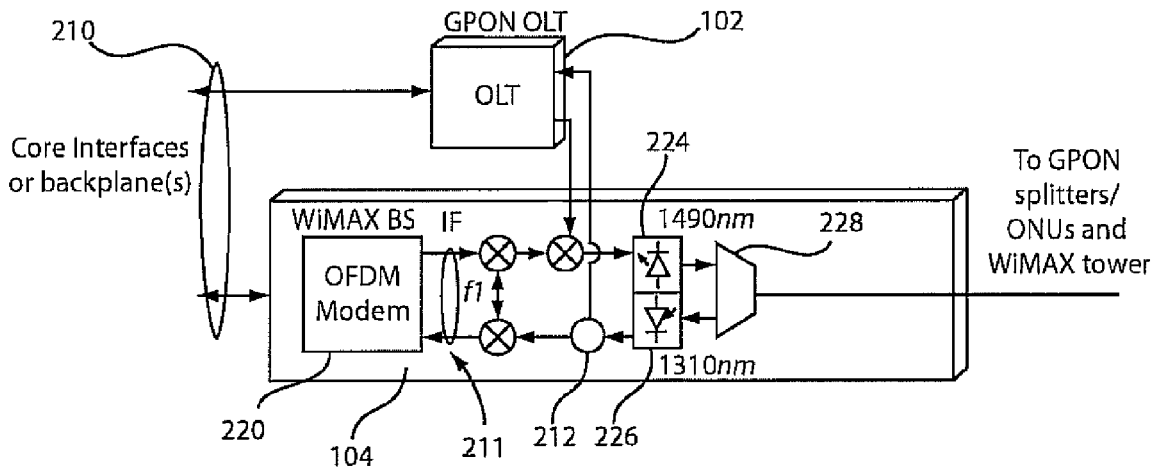
FIG. 2C is a schematic diagram showing a WiMAX base station indoor unit and GPON optical line terminal (OLT) combination integrated into a single chassis.

Referring to FIGS. 2A, 2B and 2C, an overlay-system architecture is illustrated that supports the wireless over PON network architecture in accordance with the present principles. FIG. 2A shows a central office equipment diagram with a WiMAX BS indoor unit 104 and a GPON OLT 102. FIG. 23 shows a remote WiMAX RF module 104'. FIG. 2C shows central office equipment integrated in a same chassis. Embodiments in accordance with the present principles support cases in which the OLT 102 and WiMAX base stations (BS) 104 are either integrated in a same chassis (FIG. 2C), or located separately (FIG. 2A) (which is useful when the WiMAX services are deployed over the existing GPON network, or the WiMAX BS and GPON OLT are provided by different vendors).

For the separate OLT 102 and WiMAX BS 104 solution of FIG. 2A, there are two optical fiber interfaces 204 and 206 from the WiMAX BS 104, which connect the GPON OLT 102 and remote subscriber equipment (through the GPON distribution fiber) separately. For the single chassis solution of FIG. 2C, the OLT 102 can connect to the WiMAX BS 104 through a chassis backplane 210, and even share a same electro-optic (E/O) modulator 211 and receiver 212.

The WiMAX BS 104 in FIG. 2A includes an OFDM (Orthogonal Frequency Division Multiplexing) modem 220 (as well as upper layer processing), a SCM modulator 211 (using frequency f1), an optical transmitter and receiver 224 and 226, an optical multiplexer/demultiplexer (MUX/DeMUX) 228, and an optical coupler/splitter 230. The input/output signal of the OFDM modem 220 in FIG. 2A uses IF as an example to simplify the discussion. The optical transmitter 224 could be a coarse wavelength division multiplexing (CWDM) laser driven by an SCM modulated signal, or a separate modulator driven by the CWDM laser and the SCM modulated signal. Since the GPON system preferably uses 1490 nm and 1310 nm light wavelengths for downstream and upstream separately, to guarantee that the wireless signal can pass through the GPON network, the SCM modulated wireless signal also uses 1490 nm as the downstream wavelength and 1310 nm as the upstream wavelength. Other wavelength combinations are also contemplated.

For the GPON systems that support other wavelengths without interference, wireless signals using WDM over GPON are also possible. An optical coupler/splitter 230 splits the upstream signal to the OLT 102, and couples the downstream signal from the OLT 102 with the wireless downstream signal.

Referring to FIG. 2B, a simplified schematic illustrating the concept of a BS outdoor unit 104' is depicted. An up/down converter 234 converts an IF signal to radio frequency, or the received RF signal back to IF from signals received through an antenna 235. Different signal types over optical fiber links, and the related architecture of the WiMAX BS indoor 104 and outdoor unit 104' will be described in greater detail below.

Wireless link extension: Wireless signals over fiber are one basis for the wireless over PON network in accordance with the present principles. In general, wireless over fiber may include, e.g., an RF signal over fiber, IF signal over fiber, and a digital wireless signal over fiber. RF and IF signals over fiber are analog signals over fiber. This has a multi-channel effect in nature, and needs higher power as compared to digital links due to the carrier-to-noise (CNR) requirements. The system performance is limited by the noise of various optical and electrical components in the link, and the inter-modulation/distortion due to device non-linearities. Yet, analog signals over fiber can greatly simplify the remote node (BS outdoor unit) compared to digital signals.

In one embodiment, the following assumes half duplex signal transmission between the IDU 104 and ODU 102 by default, e.g., the signal transmission from IDU to ODU and the reverse direction does not happen simultaneously. Otherwise, different fibers or wavelengths are needed in the system, which may be implemented in alternate embodiments.

Figure 3:
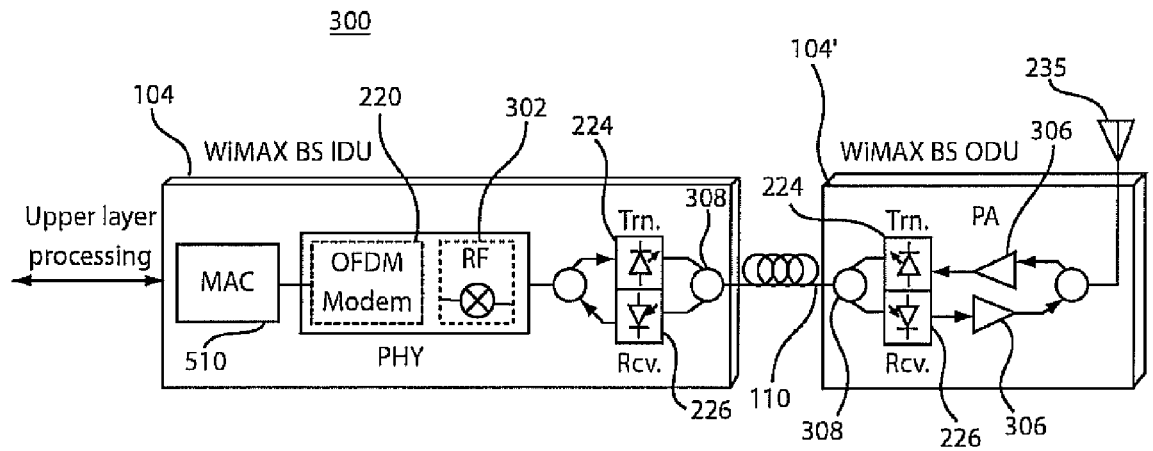
FIG. 3 is a schematic diagram showing a WiMAX base station indoor unit and outdoor unit employing radio frequency (RF) over fiber.

Referring to FIG. 3, a diagram showing an RF over fiber system 300 for a WiMAX base station 104 is illustratively depicted. An RF modulated output provided by an RF modulator 302 in the WiMAX BS IDU 104 is the signal to be transmitted to an air channel. The RF modulated output drives an optical transmitter 224, which could be a linear laser or a modulator driven by the laser and the RF signal. The output optical signal is transmitted to the outdoor unit 104' through optical fiber 110. Within the WiMAX BS ODU 104', an optical receiver 226 converts the optical RF signal to an electrical signal, and drives an antenna 235 with a power amplifier (PA) 306. Similar operation is achieved in the reverse direction.

RF over fiber makes the remote system very simple. In one embodiment, the only modules employed are optical transmitter/receiver 224, 226 and power amplifier 306. A central node 308 performs the frequency conversion so that there is centralized channel frequency management and the base stations can share central oscillator (CO) equipment (not shown). Another benefit of RF over fiber is that it is independent of the air interface and an upper layer protocol. RF over fiber uses high-speed optical-to-electrical interfaces, and there is a dispersion effect on RF power and phase noise of detected radio signal.

Unless WDM technology is applied in the wireless over PON system, RF over fiber may be difficult since SCM multiplexing is less feasible and each PON network could only support a single WiMAX base station.

Figure 4:
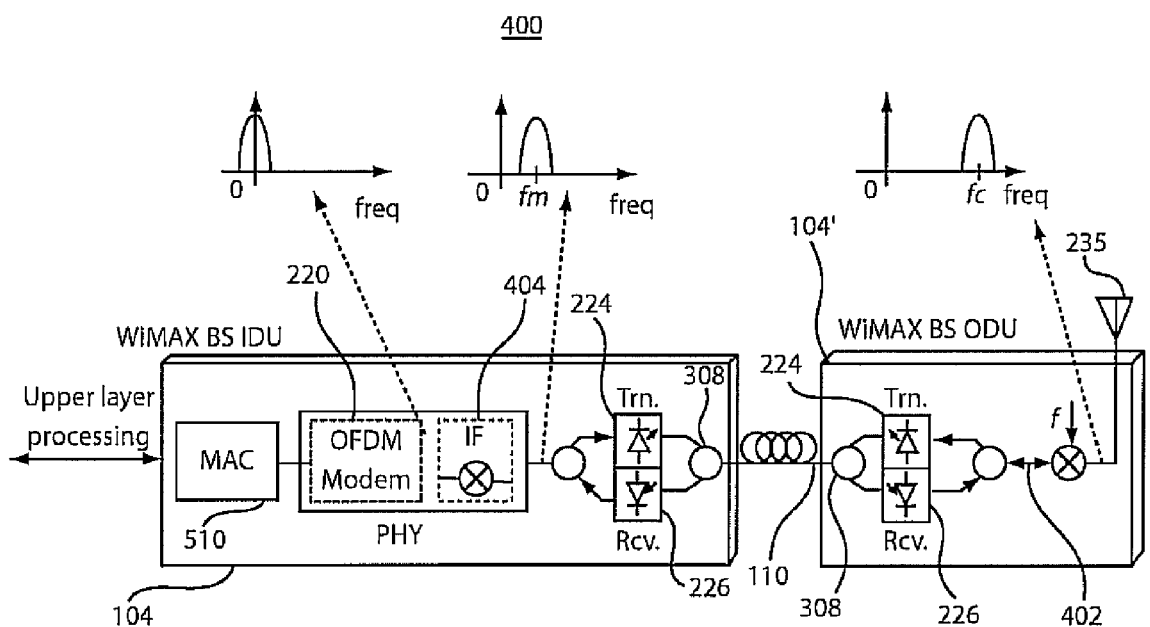
FIG. 4 is a schematic diagram showing a WiMAX base station indoor unit and outdoor unit employing intermediate frequency (IF) over fiber.

Referring to FIG. 4, a system 400 employing IF over fiber is illustratively depicted. Unlike RF over fiber which transmits an RF signal directly, IF over fiber uses a relatively low intermediate frequency (fm) from an IF modulator 404 between the indoor (104) and outdoor unit (104'). In the remote (outdoor) system 104', an RF modulator 402 further modulates the signal to the air channel frequency (fc). There are also separate power amplifiers (not shown) for the received and transmitted signals. Compared to RF over fiber, IF over fiber reduces the dispersion effect, and needs lower speed optical-to-electrical interfaces because of the lower frequency.

To enable centralized channel frequency management, one solution includes adjusting the intermediate frequency at the BS ODU 104', which modulates the signal using the IF basic frequency and the frequency offset. This solution uses bandwidth covering the full communication band. For example, if the BS uses a frequency from 5.775 GHz to 5.825 GHz, though the frequency band is further divided into 10 sub-channels and each sub-channel is only 5 MHz, the IF channel of each BS is still 50 MHz wide.

Another solution includes sending the frequency control information from the BS IDU 104 to the ODU 104', and the ODU 104' uses a clock synthesizer to control the frequency offset. This control information can be a digital signal sent through a dedicated channel, and the channel can be shared among different base stations. These solutions employ a local oscillator (LO) for frequency conversion at the BS ODU 104'.

In comparison between RF and IF over fiber, though digitized signal over fiber uses a more complicated BS ODU, the signal transmission between the BS IDU and ODU is relatively simple because of the mature digital hardware, negligible dispersion effects and increased transmission distances.

Figure 5A:
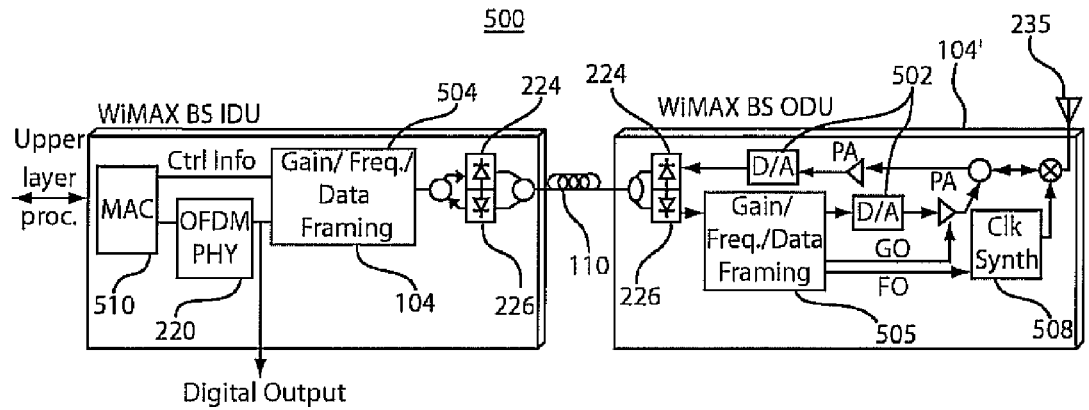
FIGS. 5A and 5B are schematic diagrams showing a WiMAX base station indoor unit and outdoor unit employing digitized wireless signals over fiber.
Figure 5B:
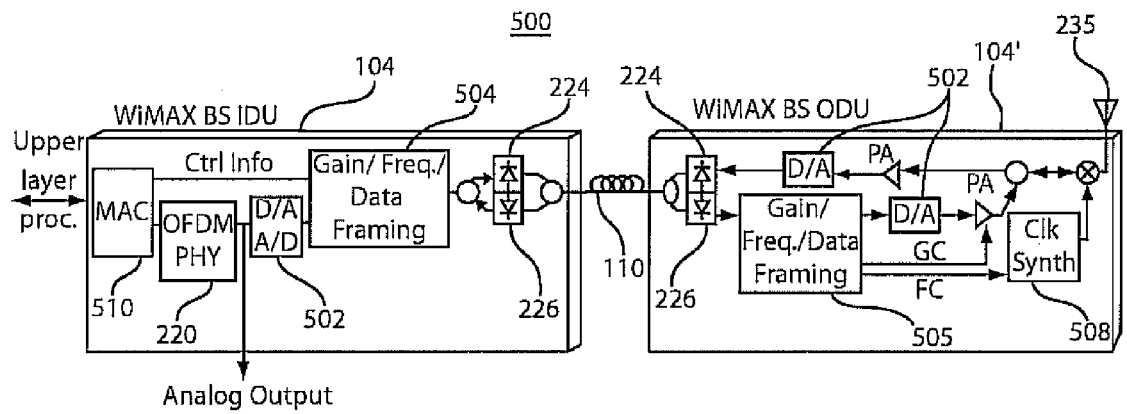

Referring to FIGS. 5A and 5B, a system 500 for digitized signals over fiber is illustratively shown. For BS's using commercial PHY products, one solution is to transmit the digital output signal directly (FIG. 5A), or use an Analog to Digital converter (A/D) 502 to digitize the analog output (FIG. 5B). A framing module 504 encapsulates the gain and frequency control information together with the data into "frames", and the framed information is transmitted to the ODU 104' through a fiber channel. At the BS ODU 104', the gain information extracted from the frame by a deframer 505 controls a power amplifier (PA) 506; the frequency information controls a clock synthesizer 508 to generate the radio frequency. In FIGS. 5A and 5B, GC represents gain control, FC represents frequency control and PA is a power amplifier.

One drawback of the solution in FIGS. 5A and 5B is the high data rate. For example, if the bandwidth is 20 MHz, according to Nyquist criterion, the sampling rate will be 40 MHz; assume each sample is quantified to, e.g., 10-bits; the bit rate will be 400 Mbit/s. An alternate solution is to extend the base station at the MAC-PHY interface 510, as shown in FIG. 6.

Figure 6:
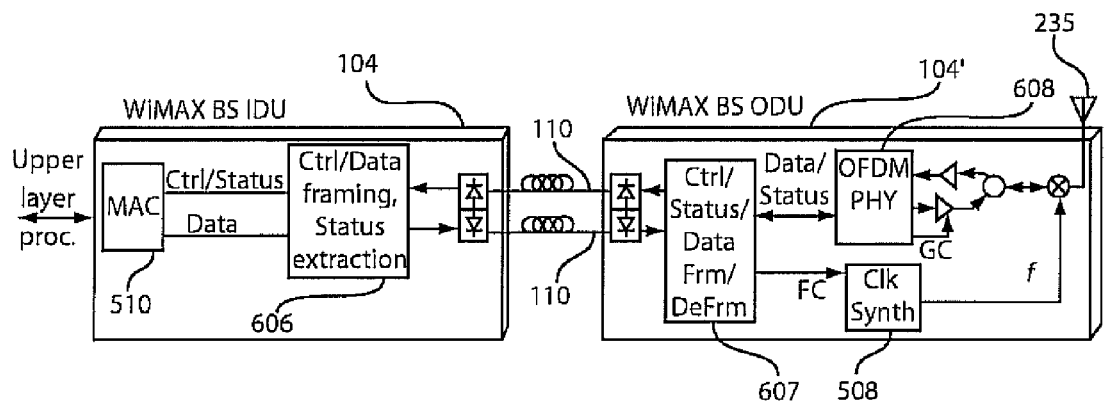
FIG. 6 is a schematic diagram showing a WiMAX base station indoor unit and outdoor unit with a wireless signal extension at a MAC-PHY interface.

Referring to FIG. 6, since there is interaction between the BS MAC 510 and PHY, a ctrl/data/framing and status extraction module 606 encapsulates the data and the control information into frames and transmits them to the ODU 104', or extracts the data and status received from the ODU 104'. Accordingly, at the BS ODU 104', a ctrl/status/data form/defrm module 607 extracts the commands and data, or encapsulates the status and data information. The next module is an OFDM PHY 608, which outputs the OFDM signal ready to modulate. Since the control and status information could be exchanged at any time and even simultaneously, the optical transmission should be full duplex, which means two fibers or SCM signals or wavelengths are employed.

The digital signal over fiber solutions may be air interface dependent; and may need frequency translation in the remote node. In addition, the transmission distance may be limited by radio system protocol timing requirements. However, due to the relatively low data rate of the wireless network (e.g., 75 Mbps maximum for WiMAX), the transmission distance is still considerable.

Wireless over GPON can use IF over fiber or a digitized signal over fiber based on the performance requirements like transmission distance and number of wireless channels in the network. For networks that need a large number of wireless channels and transmission distance, wireless signal extension at the MAC-PHY interface will meet these requirements; for systems that need a small number of wireless channels and a short distance, IF over fiber may be a better solution.

The wireless over fiber principles can be further extended to WDM-PON networks. Within a WDM-PON, the multiplexing schemes may include WDM, SCM, and TDM (Time Division Multiplexing).

Figure 7:
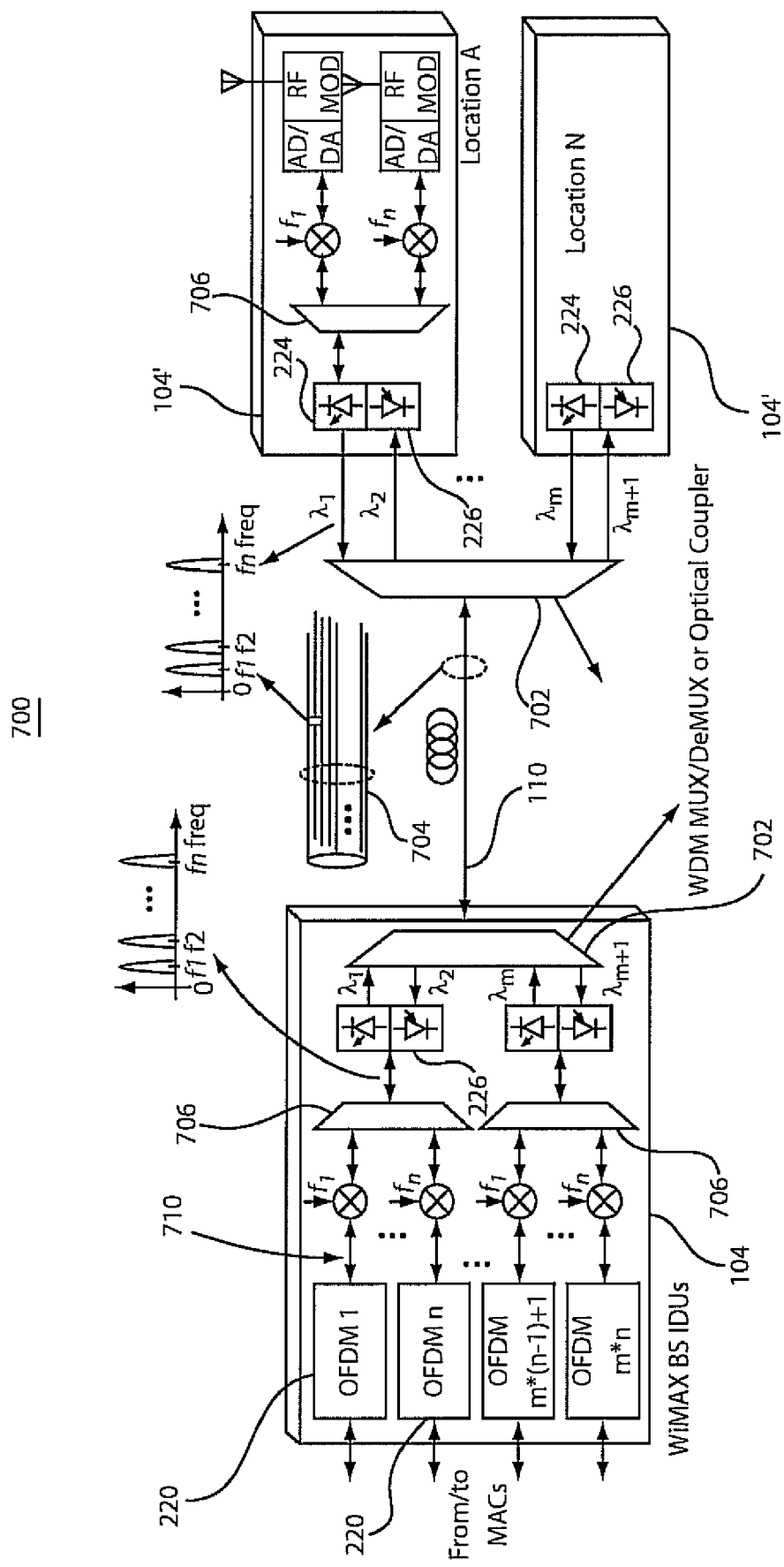
FIG. 7 is a schematic diagram showing a WiMAX base station indoor unit and outdoor unit in a WDM-PON system where sub-carrier modulation (SCM) and wavelength division multiplexing are employed for a plurality of locations.

Referring to FIG. 7, an example system 700 is illustratively shown that employs WDM for different locations, and SCM for each antenna within a same location. Table 1 lists the possible multiplexing schemes with digitized signal and the comparison of the cost. In the antenna column on Table 1, P means point and MP means multiple points.

In case the needed capacity can be handled using SCM multiplexing, another solution includes employing a unique sub-carrier for each individual wavelength, and a single optical receiver may be used at the BS IDUs 104, or each location of the BS ODUs 104'. This technology is called "parallel signal detection" (PSD). Since an optical receiver is more expensive than sub-carrier modulators, PSD can significantly reduce equipment cost.

MUX/DeMUXes or optical couplers 702 transmit and receive light over link 110. Link 110 includes an optical fiber 704 which is capable of carrying a plurality of wavelengths of light simultaneously. Each ODU 104' transmits and receives different wavelengths of light and these signals are provided to/from modulators 710 to electrical signal couplers/splitters 706, converted to/from optical signals by optical transmitters 224 and receivers 226 and multiplexed or demultiplexed by MUX/DeMUX 702.

Figure 8:
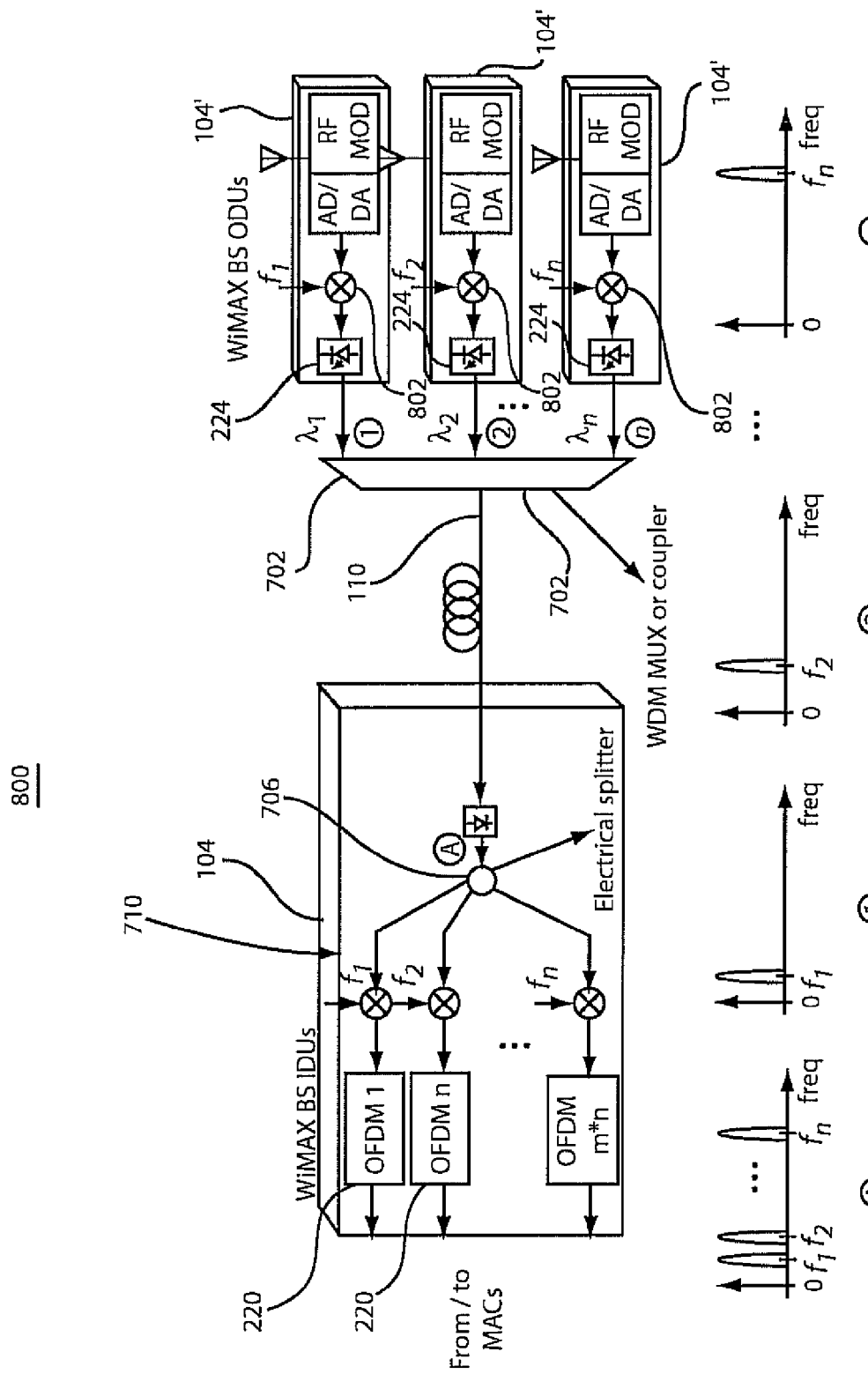
FIG. 8 is a schematic diagram showing a WiMAX base station indoor unit with a single detector for receiving multi-wavelength signals from a plurality of remote outdoor units using parallel signal detection (PSD)

Referring to FIG. 8, an example of a solution where optical receivers are replaced with sub-carrier modulators 802 to reduce equipment cost is illustratively depicted.

The present invention reduces system cost, management cost, and enables real-time information/resource sharing among base stations. For each base station, the cost reduction is at least $1000, and the managed number of interfaces is reduced from 3 to 1. It also reduces the diagnosis complexity in case of network failures due to the simplified network architecture. There is further cost reduction if the base stations share processing resources.

Embodiments described herein can benefit from aggregated processing at the edge node, which can further reduce the equipment costs. This comes from the fact that it is possible to share the processing modules (e.g., the processor) among the integrated base stations. The overlay solution as described herein has a minimum number of interfaces/equipment to manage, especially when the number of WiMAX base stations increases. Another benefit of the overlay solution in accordance with the present principles, from a management stand-point is that, in case of system failures, due to the centralized nature of the system and the reduced amount of equipment, diagnoses and repair is simplified.

Network performance: For areas that have dense ONUs or sparse user distribution, it is possible to construct a distributed antenna network, with several ONUs connected to the same WiMAX base station, as shown in FIG. 9.

Figure 9:
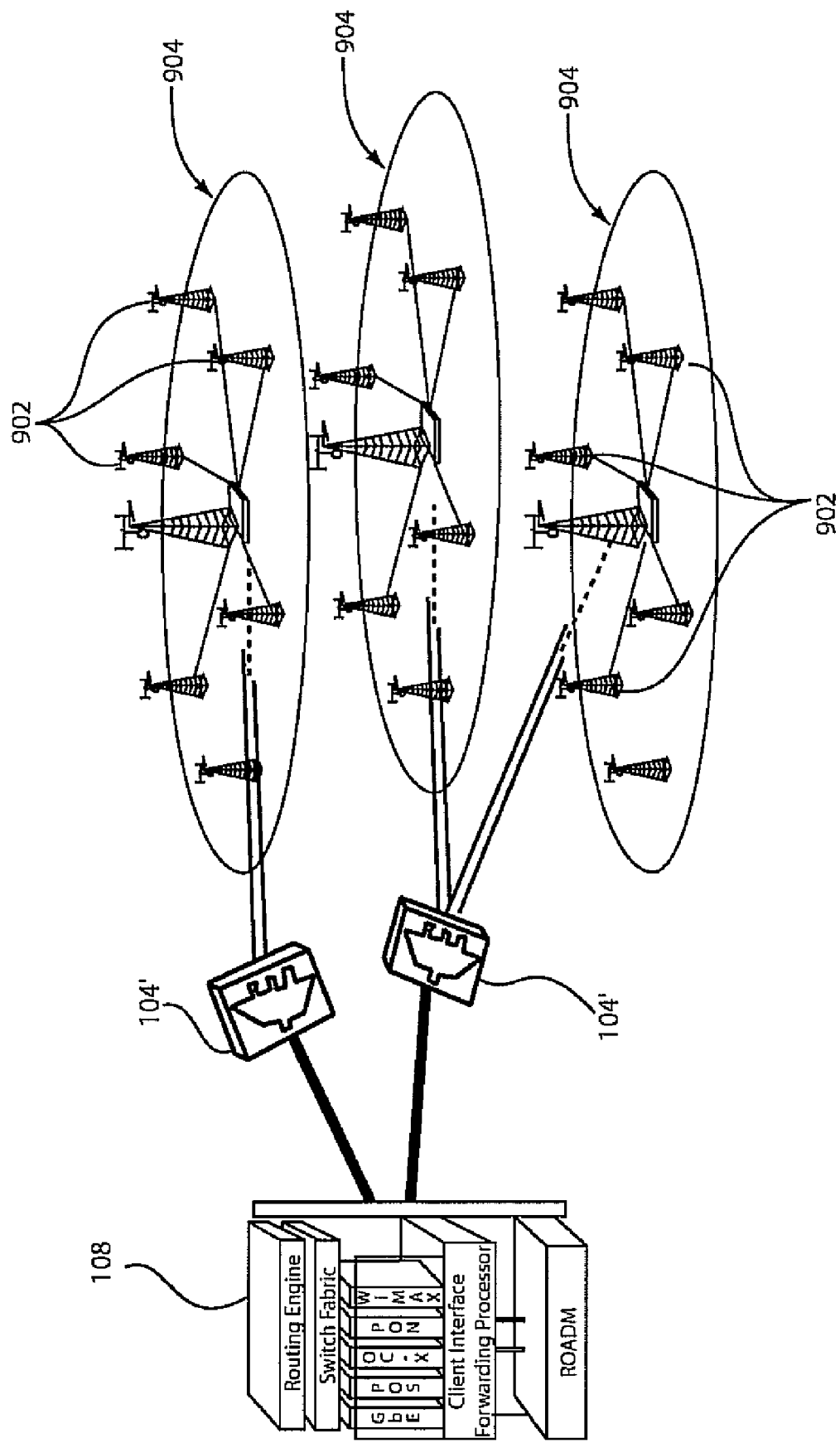
FIG. 9 is a diagram showing a distributed antenna infrastructure for wireless base stations.

Referring to FIG. 9, instead of a single central antenna at the center of each cell 904, for example, up to 7 modules 902 are geographically distributed in a cell 904 to reduce access

TABLE 1

Multiplexing Method and Comparison

|  |  | multiplexing method of digitized RF signal from individual antennas | multiplexing method of the signal from individual locations | demultiplexing method | Cost |
|---|---|---|---|---|---|
| Single-antenna | P-P |  |  |  | Inadequate for next generation radio systems |
|  | P-MP |  | WDM | WDM |  |
|  |  |  | SCM | SCM |  |
| Multiple-antenna | P-P | CDM |  | CDM (TDM) | mild |
|  |  | SCM |  | SCM | High |
|  |  | WDM |  | WDM | Very high |
|  | P-MP | CDM | WDM | WDM & CDM | High |
|  |  |  | SCM | SCM & CDM | high |
|  |  | SCM | WDM | WDM & SCM | high |
|  |  |  | SCM | SCM | high |
|  |  | WDM | WDM | WDM | Very high | distance compared with a traditional cell. Simulation results show that the distributed antenna network can help improve the wireless network throughput.

Assume that the same un-coded data is transmitted in a traditional cell with single central antenna and a cell 904 with multiple antenna modules 902. For a fair comparison, further assume that, in the cell 904 with multiple antenna modules 902, the transmit power of the antenna module 902 at the centre was 0.4 P and other six distributed antenna modules around had the same transmit power as 0.1 P, for the same total transmit power P as in the traditional cell structure. Table 2 shows the illustrative simulation results. The coverage area was improved using different modulation schemes, therefore, the wireless network throughput was improved.

Table 2 Performance comparison with distributed antenna (DA) solution:

| Modulation | BPSK | QPSK | 16 QAM | 64 QAM |
|---|---|---|---|---|
| Traditional Solution | 45% | 31% | 15% | 8% |
| DA Solution | 100% | 100% | 88% | 68% |
| Coverage Area Improvement | 222% | 323% | 587% | 825% |

Besides the improved throughput using distributed antennae, the wireless over PON solution can also improve the network resilience.

In accordance with the present principles a novel wireless over PON system is provided which takes advantage of the PON infrastructure and provides both wireline and wireless services. Cost analysis shows that this solution can effectively reduce the equipment and management cost, as well as improve the network performance. Wireless signal over optical network is provided. For the existing B/G/GE-PON systems, SCM multiplexing is possible, and in some cases, WDM multiplexing is applicable.

Having described preferred embodiments of systems and methods for wireless over passive optical networks (PON) (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A network system, comprising:
 a wireless base station integrated with an optical line terminal in a single chassis at a central office of a service provider to permit resource sharing between the wireless base station and the optical line terminal, the wireless base station being connected to the optical line terminal through a chassis backplane and sharing a common modulator and receiver with the optical line terminal, wherein the wireless base station is configured to provide portable and fixed services to customers; and
 a passive optical network coupled to the wireless base station at the central office to provide a link to extend an antenna for wireless operations of the wireless base station to a remote site such that a wireless signal from the wireless base station is transmitted in parallel with a passive fiber network signal through the link, wherein wavelength-division multiplexing is employed to transmit the wireless signal to an area, and sub-carrier modulation multiplexing is employed to distribute the wireless signal to receivers within the area,
 wherein the wireless base station transmits gain control and frequency information to the remote site for adjusting a configuration of a power amplifier and a clock synthesizer at the remote site.

2. The network system as recited in claim 1, wherein the wireless signal is a radio frequency signal.

3. The network system as recited in claim 1, wherein the wireless signal is an intermediate frequency signal.

4. The network system as recited in claim 1, wherein the wireless signal is a digitized signal.

5. The network system as recited in claim 1, wherein the signals are enabled to travel in parallel by employing wavelength-division multiplexing.

6. The network system as recited in claim 1, wherein network system includes wireline and wireless services simultaneously.

7. The network system as recited in claim 1, wherein the wireless base station includes an indoor unit at the central office and a plurality of outdoor units disposed remotely wherein the plurality of outdoor units employ a parallel signal detection method to enable a unique sub-carrier for an individual wavelength associated with each of the plurality of outdoor units.

8. The network system as recited in claim 1, wherein the wireless base station includes an indoor unit at the central office and an outdoor unit disposed remotely from the central office, the network further comprising a distributed antenna network with a given cell.

9. The method as recited in claim 1, wherein the optical line terminal and wireless base station share a common processor.

10. A method for simultaneously providing wireline and wireless services, comprising:
 integrating a wireless base station with an optical line terminal in a single chassis at a central office of a service provider to permit resource sharing between the wireless base station and the optical line terminal, the wireless base station being connected to the optical line terminal through a chassis backplane and sharing a common modulator and receiver with the optical line terminal, wherein the wireless base station is configured to provide portable and fixed services to customers;
 coupling a passive optical network to the wireless base station at the central office to provide a link to extend an antenna for wireless operations of the wireless base station to a remote site; and
 transmitting a wireless signal from the wireless base station in parallel with a passive fiber network signal through the link, wherein wavelength-division multiplexing is employed to transmit the wireless signal to an area, and sub-carrier modulation multiplexing is employed to distribute the wireless signal to receivers within the area,
 wherein the wireless base station transmits gain control and frequency information to the remote site for adjusting a configuration of a power amplifier and a clock synthesizer at the remote site.

11. The method system as recited in claim 10, wherein transmitting a wireless signal includes transmitting a radio frequency signal.

12. The method system as recited in claim 10, wherein transmitting a wireless signal includes transmitting an intermediate frequency signal.

13. The method system as recited in claim 10, wherein transmitting a wireless signal includes transmitting a digitized signal.

14. The method as recited in claim 10, wherein transmitting includes at least one of sub-carrier modulation and wavelength-division multiplexing.

15. The method as recited in claim 10, wherein the wireless base station includes an indoor unit at the central office and a plurality of outdoor units disposed remotely, and the method further comprises employing a parallel signal detection method to enable a unique sub-carrier for an individual wavelength associated with each of the plurality of outdoor units.

16. The method as recited in claim 10, wherein the wireless base station includes an indoor unit at the central office and an outdoor unit disposed remotely from the central office, and the method further comprises distributing antenna modules within a given network cell.

* * * * *